United States Patent [19]

Philbeck

[11] Patent Number: 5,493,947
[45] Date of Patent: Feb. 27, 1996

[54] SUPPORT DEVICE FOR AN ACOUSTICAL BELL

[76] Inventor: Leone Philbeck, 175 Joyce Branch Rd., Aiken, S.C. 29801

[21] Appl. No.: 446,244

[22] Filed: May 22, 1995

[51] Int. Cl.⁶ .......................... G10D 13/08; G10K 1/071; F16M 11/32

[52] U.S. Cl. .......................... 84/406; 116/171; 248/440.1; 248/176.1

[58] Field of Search ............................. 84/406, 402, 403, 84/453; 116/148, 171; 248/176.1, 440.1, 163.1

[56] References Cited

U.S. PATENT DOCUMENTS

D. 186,109  9/1959  Harley et al. .

5,010,798  4/1991  Malta .......................................... 84/406

*Primary Examiner*—Cassandra C. Spyrou
*Attorney, Agent, or Firm*—Michael A. Mann

[57] ABSTRACT

A device for supporting an acoustical bell comprises a base member carrying a channel. The channel is formed to receive the handguard of the bell so that the bell can be pivoted about its handguard. An alternative embodiment comprises a T-shaped base with a recess formed therein for receiving the handguard. Rotating the bell handle downward elevates the bell a distance above a surface so that the bell can be rung by striking it. A strip of felt or rubber can be placed in the channel as a cushion for the handguard.

16 Claims, 3 Drawing Sheets

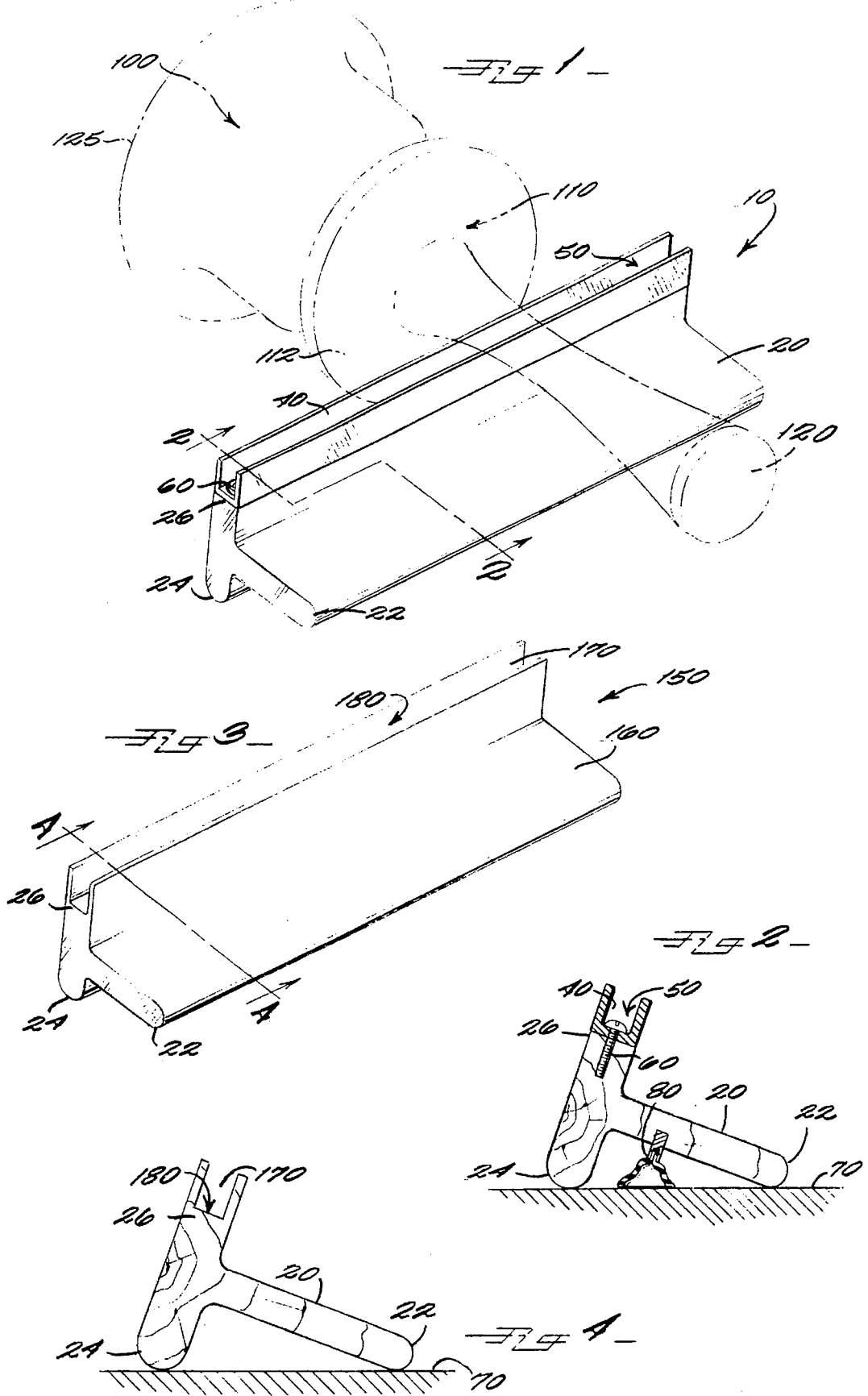

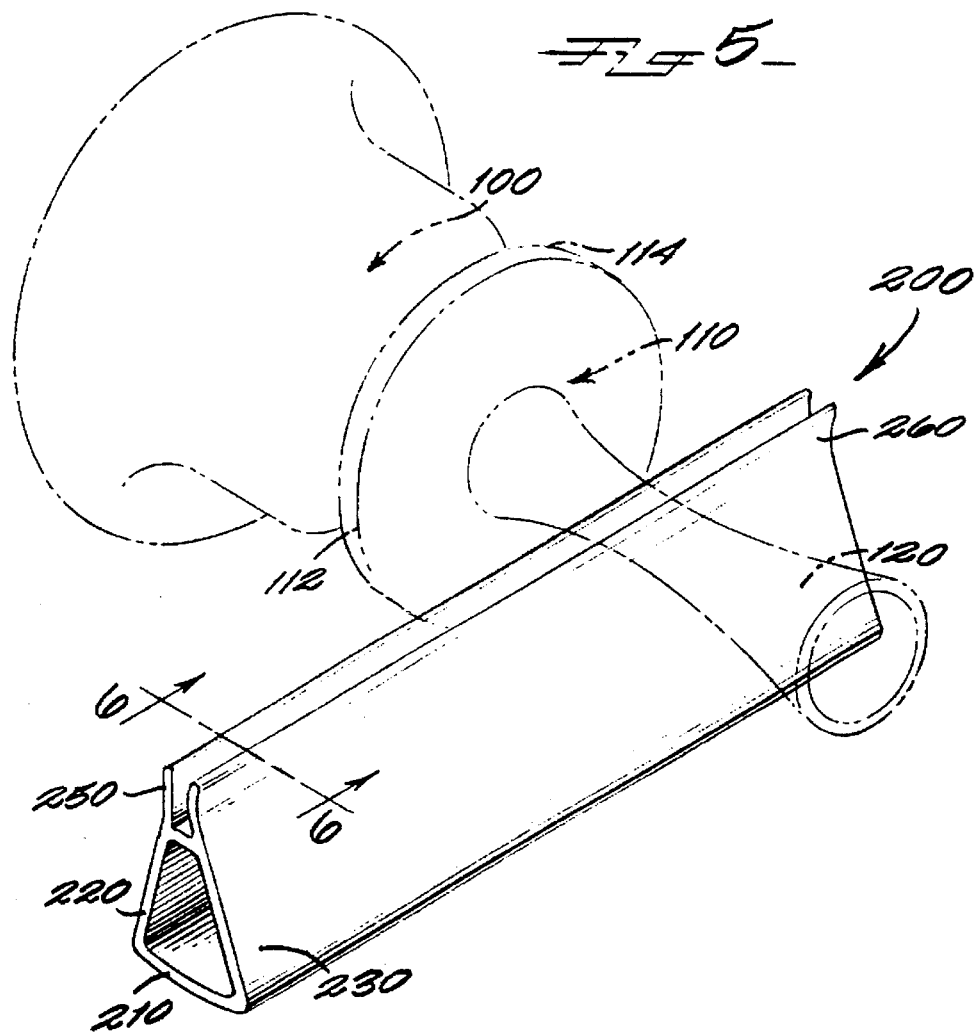
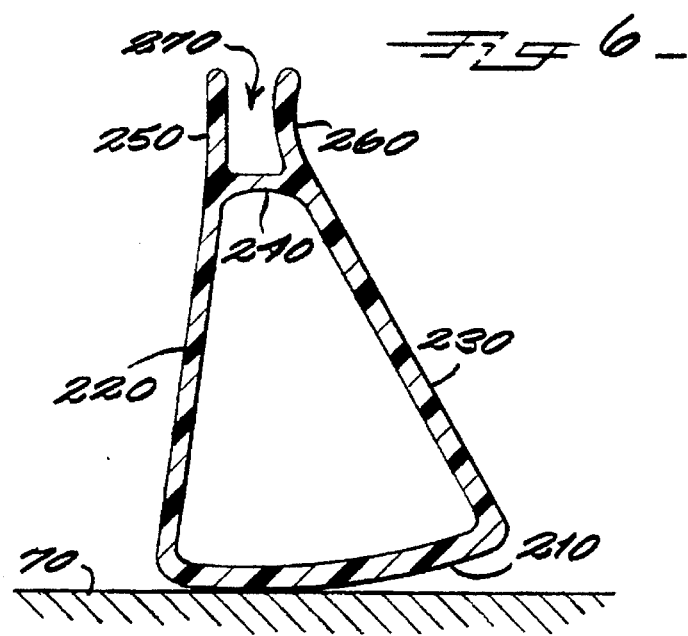

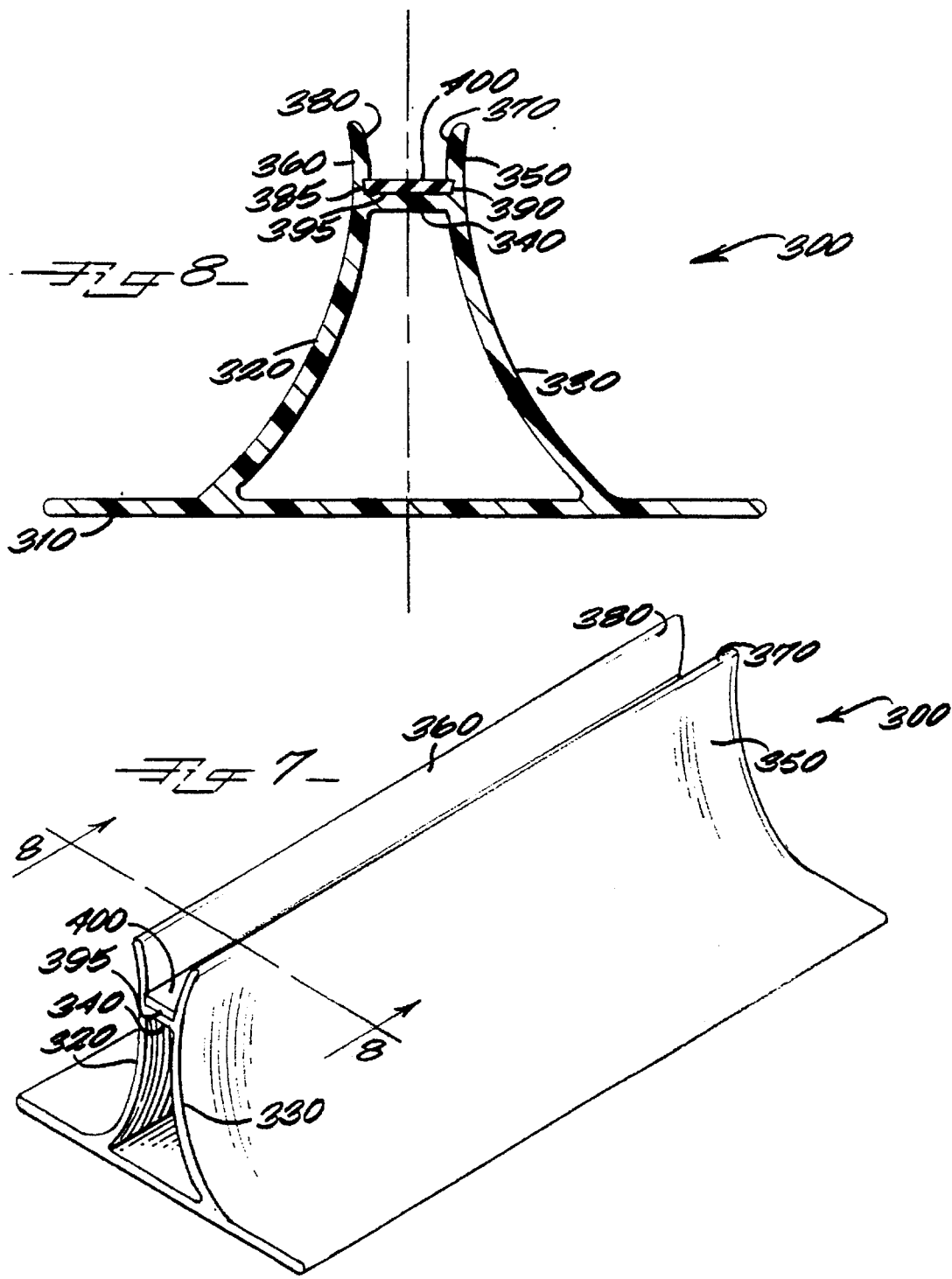

5,493,947

SUPPORT DEVICE FOR AN ACOUSTICAL BELL

BACKGROUND OF THE INVENTION

1. Field of the Invention

The present invention relates to devices for supporting acoustical bells. More specifically, the present invention relates to a device which supports a bell and enables its elevation from a surface.

2. Discussion of Background

The use of bells in various musical productions is well known. Normally, there are a plurality of bells in each production, with each bell generating a particular note in the musical scale. The bells are usually laid on a table, with one or more musicians standing behind the table. When the generation of a particular sound is required, the corresponding bell is manually lifted from the table and rung so that the clapper of the bell strikes the bell, or, alternatively, the bell can be struck with a mallet. The bell is then returned to its assigned position.

These bells are often made of heavy alloys in order to achieve the requisite acoustical quality, and are thus heavy; especially those bells designed to emit bass notes. Consequently, musicians must repetitively lift, hold, strike, and replace such bells. These repetitive actions put stress on the wrist, forearm and elbow and can cause injury, particularly carpel tunnel syndrome.

Moreover, many musical productions require these bells to be rung in rapid succession. This rapidity often causes the musician to hastily return a bell that has been rung and quickly grasp the next bell. In so doing, the acoustical and musical integrity of the bell is often compromised.

Therefore, there exists a need for an acoustical bell support device which supports a bell and simplifies the process of ringing.

SUMMARY OF THE INVENTION

According to its major aspects and briefly stated, the present invention is a device for use in supporting and playing an acoustical bell. In particular, the present invention comprises a base having a channel attached to it. The channel, defined by a top and two spaced-apart plates, is dimensioned to receive the handguard of a bell. In an alternative preferred embodiment, the base is T-shaped and one end of the T-shaped base is formed with a recess, into which the handguard is positioned. The channel, or recess, may include a strip of felt or rubber to cushion the handguard of the bell.

In use, the base is positioned on a flat surface. The handguard of the bell is positioned within the channel or recess. In this position the bell will rest partly on the flat surface and partly on the device. To ring the bell, one presses the handle downward to rotate the bell about its handguard to elevate the bell above the surface. The bell is then struck with a mallet. Thereafter, the handle is released to pivot the bell back to the surface to its resting position.

A major feature of the present invention is the base. The base supports the bell when resting and when being struck and serves as a fulcrum, providing its mechanical advantage to enable the bell to be played without lifting its full weight.

Another major feature of the present invention is the channel attached to an end of the T-shaped base or, in the alternative embodiment, formed as the recess in the base. The channel may be dimensioned to receive any size bell and is preferably lined with a strip of rubber or felt to cushion the handguard.

Still another important feature of the present invention is the combination of the bell and the base. The base acts as an extension of the handguard, but not to protect the bell from contact by the user's hand, which is the usual function of the handguard; rather, the base extends the radius of the handguard so that the bell can be pivoted about the handguard, which is, conveniently and importantly, located as close to the balance point of the bell as possible for maximum leverage. Further, the channel carded by the base and the handguard cooperate so that the bell can be safely supported as it is pivoted about the handguard for ringing. Thus, the base converts the handguard from being a guard for the hand to being a part of a fulcrum.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a support device for an acoustical bell according to a preferred embodiment of the present invention with a bell shown in ghost;

FIG. 2 is a cross sectional side view of a support device for an acoustical bell according to a preferred embodiment of the present invention taken along line 2—2 of FIG. 1;

FIG. 3 is a perspective view of a support device for an acoustical bell according to an alternative preferred embodiment of the present invention;

FIG. 4 is a cross sectional view of a support device for an acoustical bell according to an alternative preferred embodiment of the present invention taken along line 4—4 of FIG. 3;

FIG. 5 is a perspective view of a support device for an acoustical bell according to another alternative preferred embodiment of the present invention;

FIG. 6 is a cross sectional view of a support device for an acoustical bell according to another alternative embodiment of the present invention taken along line 6—6 of FIG. 5;

FIG. 7 is a perspective view of a support device for an acoustical bell according to still another alternative preferred embodiment of the present invention; and FIG. 8 is a cross sectional end view of a support device for an acoustical bell according to still another alternative preferred embodiment of the present invention taken along line 7—7 of FIG. 7.

DETAILED DESCRIPTION OF A PREFERRED EMBODIMENT

In the following description, similar components are referred to by the same reference numeral in order to simplify the understanding of the sequential aspect of the drawings.

Referring now to FIG. 1 and FIG. 2, there is shown a support device for an acoustical bell according to a preferred embodiment of the present invention generally designated by reference numeral 10. Device 10 comprises a T-shaped base 20 having ends 22, 24, and 26, and a channel 40. Channel 40 extends from end 26 of base 20. An interior 50, defined by channel 40, is fitted to receive handguard 110 of bell 100. Securing means 60 affix channel 40 to end 26 of base 20. As illustrated, securing means 60 are shown as screws, however, it is noted that other securing means, such as nails or adhesives, are anticipated by the present invention.

Turning now to FIG. 3 and FIG. 4, there is shown an alternative preferred embodiment of the present invention generally designated by reference numeral 150. Device 150 comprises a T-shaped base 160 having a recess 170 formed at end 26. Recess 170 defines an interior 180 that receives handguard 110 of bell 100.

Support device 10, channel 40 and support device 150 can be made of any material commonly used by those skilled in the art including, but not limited to, plastic, wood and metal. However, care must be taken to choose a material that does not affect the acoustical sound of the bell.

In operation, a user positions base 20 (160) so that ends 22 and 24 rest against flat surface 70. Thereafter, handguard 110 of bell 100 is positioned within channel 40 (or recess 170) so that handle 120 of bell 100 is oriented above end 22. In this position, mouth 125 of bell 100 will rest against flat surface 70. At this point, if desired, bell 100 may be rung while resting against surface 70, thereby producing a damped or muffled sound. To produce an undamped sound, bell 100 is elevated from surface 70 by rotating handle 120 downward toward end 22. This motion raises bell 100 a distance above surface 70. Thereafter, the user rings the bell, issuing a clear, undamped sound. Return of the bell to the resting state is accomplished by rotating handle 120 upward until bell 100 comes to rests on surface 70.

Referring now to FIG. 5 and FIG. 6, there is shown, in perspective and cross-section, another alternative preferred embodiment of a support device generally designated by reference numeral 200. Device 200 comprises a slightly curved bottom 210, integrally attached to sides 220 and 230. Integrally attached to sides 220 and 230 is a top 240. Extending from top 240 is a first plate 250 and a second plate 260. Second plate 260 is slightly curved, whereas first plate 250 is substantially perpendicular to top 240. Plates 250 and 260 define a distance 270 therebetween. Distance 270 is slightly less than the width of handguard 110 so that plates 250 and 260 frictionally engage faces 112 and 114 of handguard 110 and provide a secure fit. Preferably, device 200 is made of a durable, slightly flexible plastic.

In use, handguard 110 is placed in between plates 250 and 260. Due to the slight curvature of bottom 210, the application of a modest downward force upon handle 120 will cause device 200 to rock and thereby elevate bell 100 a distance above surface 70. Thereafter, bell 100 is rung by any method employed by those skilled in the art.

Referring now to FIG. 7 and FIG. 8 there is shown, in perspective and cross-section, still another alternative preferred embodiment of a support device generally designated by reference numeral 300. Device 300 comprises a base 310, integrally attached to sides 320 and 330. Integrally attached to sides 320 and 330 is a top 340. Extending from top 340 is a first plate 350 and a second plate 360. Each plate 350 and 360 has an interior surface 370 and 380, respectively. Each interior surface 370 and 380 has formed therein a recess 385 and 390, respectively. Disposed along the length of surface 395 of top 340 and within recesses 385 and 390 is a strip of material 400. Strip 400 is preferably adhesively attached to top surface 395 and can be made of any material that protects the bell handguard from damage. Such materials include, but are not limited to, felt and rubber.

It will be clear that the bell can be pivoted about the edge of the handguard or about the bottom of the base; that is, the pivot point can be the contact between the handguard and the channel or the contact point between the base and the surface, respectively. The pivot radius is longer in the latter case, being from the centerline of the handguard all the way to the surface rather than just to the edge of the handguard. However, in either case, the bell can be lifted clear of the surface so that it can be struck. Preferably, the base is secured to the surface and the bell therefore pivoted about the handguard, in the channel of the base, rather than about the base, although the mechanical advantage of the latter is greater. Because the bell only needs to be lifted a small distance, it is believed the greater stability of pivoting the bell in the secured channel about the handguard is worth the tradeoff in mechanical advantage.

It will be apparent to those skilled in the art that many changes and substitutions can be made to the preferred embodiment herein described without departing from the spirit and scope of the present invention. For example, attaching an extension to the handguard, extending the handguard's radius, so that the bell can be pivoted about the extension and is deemed to be equivalent to pivoting the handguard in the channel of a base where the base is in effect elevating the surface. The invention, including all equivalents, is as defined by the appended claims.

What is claimed is:

1. In combination, a device comprising:

a bell having a handle, and a handguard;

a base; and means carried by said base for receiving said handguard of said bell into said base so that said bell can be pivoted about said base.

2. The device as recited in claim 1, wherein said base further comprises a T-shaped member, said receiving means formed in said base.

3. The device as recited in claim 1, wherein said receiving means further comprises a channel, said channel attached to said base.

4. The device as recited in claim 1, further comprising means for securing said receiving mean to said base.

5. The device as recited in claim 1, wherein said base is made of a material selected from the group consisting of wood, plastic and metal.

6. The device as recited in claim 1, wherein said receiving means is made of a material selected from the group consisting of wood, plastic and metal.

7. The device as recited in claim 1, further comprising means carried by said receiving means for cushioning said handguard.

8. The device as recited in claim 1, wherein said receiving means further comprises:

a top attached to said base;

a first plate; and a second plate, said second plate spaced apart from and opposing said first plate, said first and said second plates attached to and extending from said base.

9. The device as recited in claim 1, wherein said receiving means further comprises:

a top attached to said base;

a first plate;

a second plate, said second plate spaced apart from and opposing said first plate, said first and said second plates attached to and extending from said base; and a strip placed on said top, said strip made of a material selected from the group consisting of felt and rubber.

10. A device adapted for supporting an acoustical bell, said bell including a handle and a handguard, said device comprising:

a base;

a channel carried by said base and formed to receive said handguard of said bell so that said bell is supported by said base and said handguard can pivot in said channel when said handle is pressed, said base dimensioned to support said bell when said bell is pivoted; and cushion means positioned in said channel on which said handguard rests.

11. The device as recited in claim 10, wherein said securing means is selected from the group consisting of screws, adhesives or nails.

12. The device as recited in claim 10, wherein said base is made of a material selected from the group consisting of wood, plastic and metal.

13. The device as recited in claim 10, wherein said channel is made of a material selected from the group consisting of wood, plastic and metal.

14. A method for ringing an acoustical bell, said bell having a handle and a handguard, said method comprising the steps of:

placing a base under said handguard of said bell;

pivoting said bell by pressing on said handle; and striking said bell.

15. The method as recited in claim 14, wherein said bell is pivoted about said handguard in said pivoting step.

16. The method as recited in claim 14, wherein said bell is pivoted about said base in said pivoting step.

\* \* \* \* \*